United States Patent [19]

Regehr et al.

[11] 4,238,210

[45] Dec. 9, 1980

[54] PARTICLE-REMOVAL APPARATUS

[76] Inventors: Ulrich Regehr, Süsterfeldstr. 65, 51 Aachen; Horst Hannemann, Haus-Heyden Str. 256, 5120 Herzogenrath; Siegfried Bulang, Drievogel 177, Kerkrade (NL); Helmut Derichs, Halfenstr. 41, 51 Aachen; Vladimir Knuplez, Schindlerstr. 11, 51 Aachen; Martin Wedrich, Zeppelinstr. 65, 51 Aachen, all of Fed. Rep. of Germany

[21] Appl. No.: 33,501

[22] Filed: Apr. 26, 1979

[30] Foreign Application Priority Data

Apr. 27, 1978 [DE] Fed. Rep. of Germany .... 2818510

[51] Int. Cl.³ .............................................. B01D 45/12
[52] U.S. Cl. .................................... 55/396; 55/398; 55/423; 55/452; 55/457
[58] Field of Search ............... 55/394, 396, 398, 410, 55/416, 423, 449, 450, 452, 456, 457, 466

[56] References Cited

U.S. PATENT DOCUMENTS

| 887,893 | 5/1908 | Wickstrum et al. | 55/456 |
|---|---|---|---|
| 1,533,501 | 4/1925 | Hughes | 55/423 |
| 1,866,663 | 7/1932 | Morris | 55/457 |
| 2,918,139 | 12/1959 | Silverman | 55/457 |
| 3,092,480 | 6/1963 | Diaz-Compain | 55/423 |
| 3,961,923 | 6/1976 | Rouhani | 55/457 |

FOREIGN PATENT DOCUMENTS

| 2513991 | 10/1976 | Fed. Rep. of Germany . | |
|---|---|---|---|
| 1089554 | 3/1955 | France | 55/423 |
| 1599713 | 10/1970 | France | 55/457 |
| 1146262 | 3/1969 | United Kingdom | 55/396 |
| 434964 | 11/1974 | U.S.S.R. | 55/452 |

*Primary Examiner*—David L. Lacey
*Attorney, Agent, or Firm*—Karl F. Ross

[57] ABSTRACT

A uniflow cyclone separator for the removal of solid or liquid particles from a gas stream comprises a housing forming a flow path with a central body from which swirl-generating vanes extend outwardly. The housing is surrounded by a collection chamber and the vanes are formed with collection edges and channels which open through the housing wall into this chamber. Downstream of the swirl-generating vanes are outlet slots which are pitched substantially transverse to the cyclonic stream of the gas.

6 Claims, 5 Drawing Figures

PARTICLE-REMOVAL APPARATUS

FIELD OF THE INVENTION

The present invention relates to an apparatus for removing solid and liquid particles from a gas stream and, more particularly, to a uniflow cyclone separator of the type in which a gas stream traverses a duct and, in passing along the duct, a swirl is induced in the gas stream which tends to throw entrained particles outwardly.

BACKGROUND OF THE INVENTION

Uniflow cyclones which operate in accordance with the principles described, generally comprises a flow housing or duct provided with swirl-inducing vanes which impart a rotation to the gas stream traversing the duct. This rotation or cyclonic action tends to throw entrained particles outwardly and these particles can be collected in a chamber provided outwardly of the duct mouth.

Such swirl-inducing vanes, which can surround a central body, will generally be provided at an angle to the axis or gas flow direction, i.e. the so-called pitch or attack angle of the vane and in a number sufficient to generate the desired centrifugal action by rotation of the gas stream. Such vanes will have leading edges which are first encountered by the oncoming gas stream and trailing edges at which the gas stream departs from contact with the vanes.

A uniflow cyclone of this type is described in German patent document - Open Application DE-OS No. 25 13 991 in which communication is afforded through perforations in the wall of the flow duct between the interior thereof and the surrounding collection chamber. The particles entrained with the gas, upon being thrown outwardly, pass through these perforations or openings in the sieve-like wall.

Experience with such apparatus has shown that the perforations in the wall give rise to a significant pressure loss in the flowing gas stream which is not turned into particle separation work. Furthermore, the cost of the unit is relatively high and hence it has not been as successful as the principles underlying such separation would appear to suggest.

OBJECTS OF THE INVENTION

It is the principal object of the present invention to provide an improved uniflow cyclone which is free from the disadvantages of the earlier system described.

Another object of this invention is to provide a particle-removal apparatus with improved separation efficiency, low pressure drop or losses and effectiveness in the removal of large droplets or particles as well as fine droplets or particles.

Still another object of this invention is to provide a low cost uniflow cyclone, especially for the removal of liquid droplets forming a gas stream which operates at a high efficiency for a broad range of particle sizes and incoming gas velocities and yet generates relatively low pressure losses in the gas stream traversing the apparatus.

SUMMARY OF THE INVENTION

These objects and others which will become apparent hereinafter are attained, in accordance with the present invention, in a uniflow cyclone separator which comprises a central duct or tube traversed by the gas stream from its inlet end to its outlet end or mouth and provided internally with a central body and with a plurality of swirl-inducing vanes radiating outwardly from this body and imparting rotation to the gas stream as it passes the body.

The duct is surrounded by a housing forming an annular collecting chamber which can extend over the length of the duct, at least to the region of the vanes. According to the invention, at least several of the vanes, along their trailing edges, are provided with collecting channels defined by an inlet slit opening into the oncoming gas, i.e. in the direction of the inlet of the duct, at least one edge defining these inlet slits being transverse to the rotary flow of the gas. The channels open at their outer ends through the wall of the duct into the collecting chamber.

According to the invention, the inlet slits of the individual channels are formed between an edge at the surface of the respective vane and an edge of a channel-forming wall projecting out of the plane of this vane surface.

The channels can have any desired cross section, e.g. round or rectangular.

In practice it has been found that when such edges are provided, a significant part of the liquid droplets or fine solid particles are collected in the channels and are transported outwardly by the action of the gas to pass through the openings in the duct wall into the collecting chamber. Other means can, of course, also be used to induce the flow of collected materials along the channel.

In the first or simplest case, the collecting channels extend in the direction of the rotary flow of the gas and are somewhat inclined to the direction of this flow so that a component of the flow induces the material to move along the channels to the openings at the outer ends thereof.

While the channels do not have to be provided over the full lengths of the vanes, it has been found to be advantageous to have them as long as possible and thus they, in the preferred state, extend from the central body to the duct wall.

According to another essential feature of the invention, the wall of the duct is formed downstream of the swirl-generating vanes with a plurality of outlets in the form of slots or slits inclined to the rotating gas stream and preferably transverse thereto.

These slots can have lengths L which are substantially equal to the widths B of the vanes.

The collecting chamber can be closed at its downstream end in the direction of gas flow, e.g. by an appropriate cover, but preferably is open, the duct opening at its mouth or discharge end of a free edge into this chamber or housing. This mouth or outlet end of the duct can be formed with an outwardly bent, diverging frustoconical collar defining a slot with the outer housing wall which communicates with the chamber lying coaxially outwardly of the duct.

In its preferred orientation, the uniflow cyclone of the present invention is upright and the gas is fed into the device from the bottom while the collected particles flow downwardly and are discharged at the lower end of the compartment at which a discharge pipe can be provided for emptying the collected liquid or fine solid particles.

If the outer housing is upwardly open, liquid collecting on wall portions downstream of the outlet of the duct can also collect in the chamber.

While the swirl-generating vanes can be simple plates, it is also possible to provide them with a cross section having an aerodynamic profile to further reduce the pressure drop or losses in the system. The aerodynamic profile may be an upward taper with a round leading edge similar to the profiles in air foils.

The swirl-inducing vanes can also be either planar or bent, e.g. into a spiral configuration, to increase the twist imparted to the gas and, if desired, the attack angle can be adjustable.

The uniflow cyclone of the present invention has been found to be of relatively simple and inexpensive construction, of surprisingly low pressure drop and high separating efficiency, and free from the disadvantages of the prior art system described previously.

BRIEF DESCRIPTION OF THE DRAWING

The above and other objects, features, advantages of the present invention will become more readily apparent from the following description, reference being made to the accompanying drawing, in which.

SPECIFIC DESCRIPTION

Figure 1:
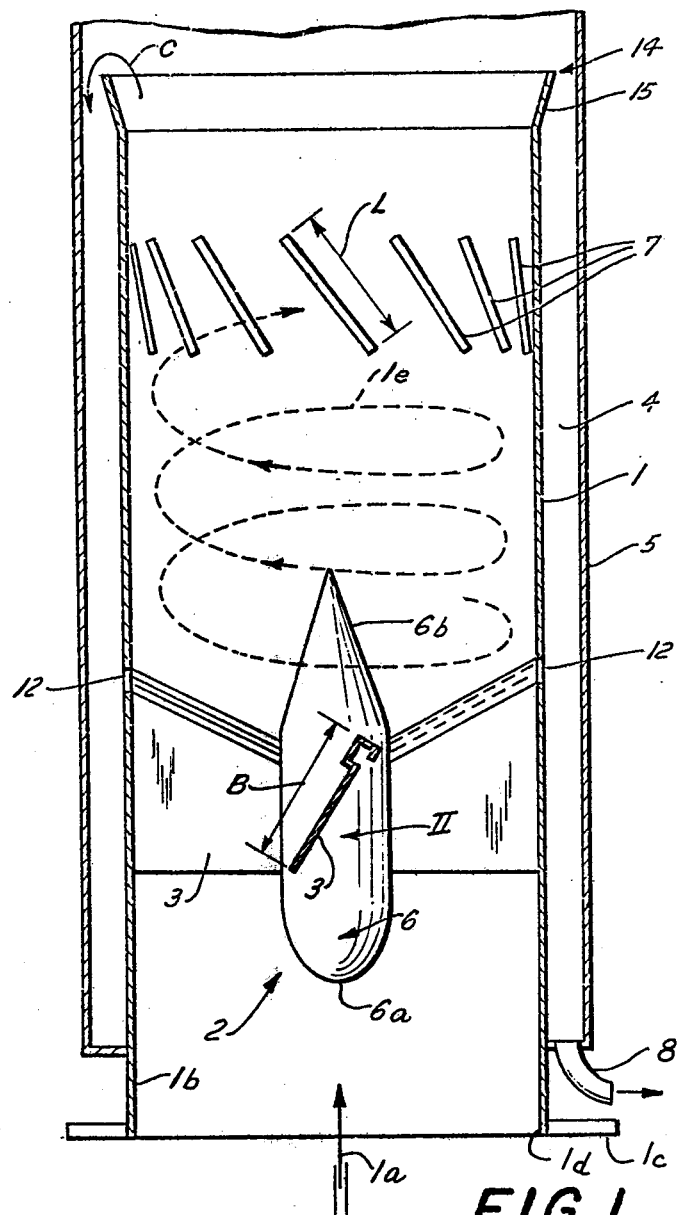
FIG. 1 is a vertical cross sectional view through a uniflow cyclone embodying the invention.

The apparatus shown in FIG. 1 is a uniflow cyclone for the removal of liquid droplets or dust (hereinafter referred to simply as particles) from a gas stream admitted in the direction of the arrow 1a.

The apparatus comprises an inner duct 1 forming a flow passage 1b and flanged at 1c around its inlet 1d for connection to a source of the gas.

At an intermediate location along this duct 1, there is provided a central body 6 of axially symmetrical streamlined configuration with a rounded leading end 6a turned toward the upstream and a conical trailing end 6b the downstream side.

The central body 6 is supported by a plurality of generally radially extending swirl-generating vanes 3 whose angle of attack can be seen in FIG. 1 and which induces the gas stream to have a cyclonic flow as represented by the arrow 1e. The vane, seen in the direction of the arrow II, is illustrated in greater detail in FIG. 3.

While only some of the vanes need be provided with collecting channels in accordance with the principles of this invention, in the embodiment illustrated all of the vanes have these channels.

Figure 2:
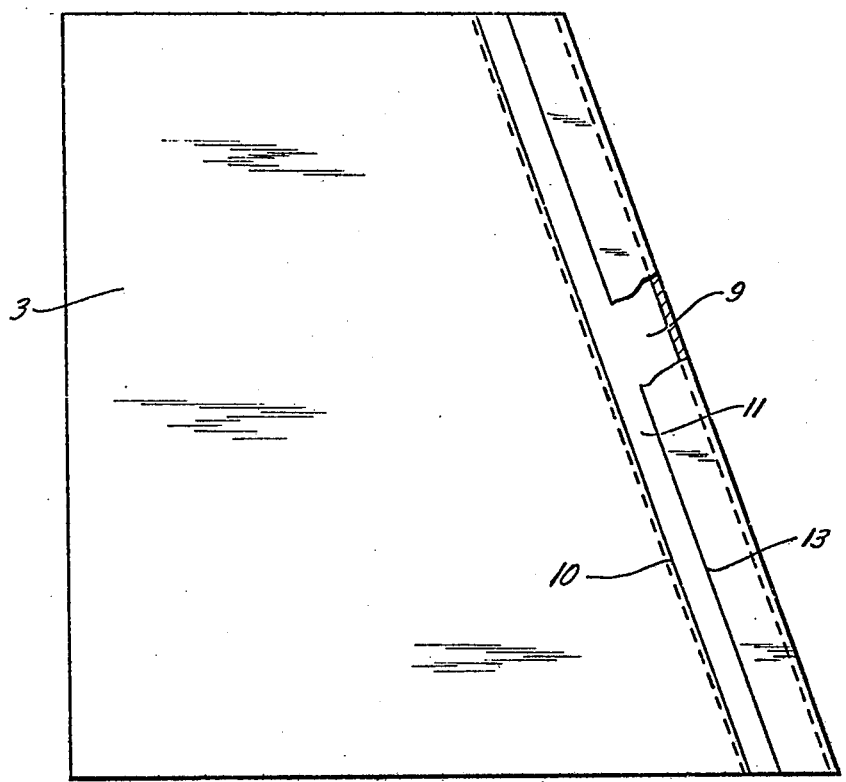
FIG. 2 is an elevational view of a swirl-inducing vane having a portion thereof broken away.

Along the trailing edge 10 of each vane 3, therefore, there is provided a collecting channel 9 which can be formed unitarily on the vane (FIGS. 2, 3 and 3A) or set into the vane (FIG. 4) and defined in part by overhanging flange 9a which extends beyond the plane 3a of the vane encountering the gas stream. The flange 9a has an edge which defines with the trailing edge 10 of the vane, an inlet slit 11 which enables particles swept upwardly along each vane to collect in the channel and be driven by the rotating movement of the gas upwardly and outwardly along the vane channels to outlets 12 formed in the wall of the duct 1, whence the collecting channels 4 surrounding the duct 1 and defined between the latter and the outer duct or housing 5. The chamber 4 is closed at its bottom and formed with a pipe 8 or the like from which the collected materials can be removed.

From the drawing it can be seen that the channels are inclined in the direction of rotation of the gas stream and relative to the axis at an angle of attack of less than 90°.

Each vane 3 can have a width B which increases outwardly. Downstream of the vanes 3, the duct 1 is formed with outlet slots 7 which are inclined to the axis, i.e. are pitched to lie substantially perpendicular to the swirling flow of the gas as represented at 1e. The slots 7 are disposed in a band around the duct 1 upstream of the outlet or mouth of the duct. They have lengths L which can be equal to the widths B of the vanes, i.e. range from the smallest to the largest widths of the vanes.

Figure 3A:
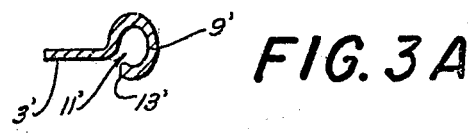
FIG. 3A is a detail view of a collecting channel, in section, according to another embodiment of the invention.
Figure 3:
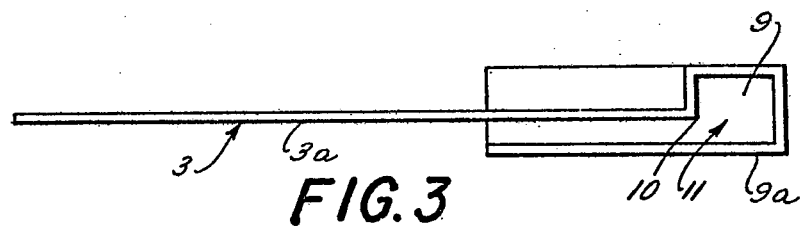
FIG. 3 is an end view in the direction of arrow III of FIG. 2 of this vane.
Figure 4:
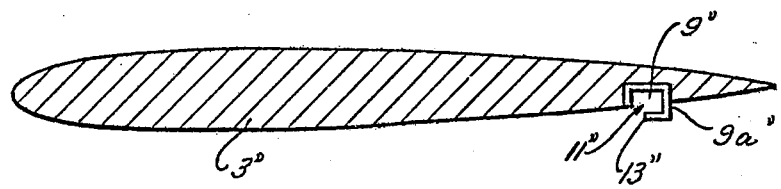
FIG. 4 is a section through another vane for use in the apparatus of FIG. 1.

While the channels 9 are shown to have a rectangular cross section in FIGS. 3 and 4, it will be apparent they also can have round cross sections as shown for the channel 9' in FIG. 3A in which the slit 11' is constituted between the edge 13' and the remainder of the vane 3'. In FIG. 4 the vane 3" is shown to have an aerodynamic profile and to taper in the downstream direction, the channel 9" being formed by an insert 9a" with an edge 13" defining the slit 11".

In all the embodiments, the edges 13, 13' and 13" project from the plane of the surface of the vane and thus act as skimmer edges while the end of each vane in the respective channel, e.g. the edge 10, forms an overflow edge along which the materials pass into the channels. This has been found to be important to minimize flow losses.

The discharge end or mouth of the duct 1 has an outwardly diverging collar 15 forming an overflow edge 14. The slots 7 and the openings 12 are dimensioned so that a portion of the gas flows over the edge 14 as represented by the arrow C and is drawn into the chamber 4 to facilitate sweeping of collected material toward the bottom of this chamber.

Downstream of the outlet of duct 1, the apparatus can be provided with impinging surfaces of conventional design to further separate particles from the gas, these particles likewise passing into the chamber 4.

Naturally, a number of devices of the type illustrated in FIG. 1 can be provided one above the other and indeed a plurality of spaced apart swirl-generating devices 2 can be provided in the duct 1 so as to increase stepwise the rotary velocity of the gas.

The number of slots 7 can be equal in number to the vanes or greater and the apparatus can be provided with a spray head or the like upstream or downstream of each of the swirl generators 2 for scrubbing the gas, this being especially advantageous when the gas contains solid particles.

We claim:

1. A uniflow cyclone for the removal of particles from a gas stream entraining same, said uniflow cyclone comprising:
   a duct having an upstream end receiving said gas stream and a downstream end;
   swirl-inducing means in said duct between said ends for imparting rotary movement to the gas stream as it traverses said duct, said swirl-inducing means comprising a body disposed centranlly in said duct and a plurality of angularly spaced vanes disposed around said body and pitched to deflect said stream angularly, at least some of said vanes having trailing edges formed with longitudinally extending collecting channels which have slits open to the gas stream;

a plurality of elongated outlet slots formed in the duct downstream of said swirl-inducing means; and a housing surrounding said duct and defining a collecting chamber communicating with the interior of said duct through said slots, said channels communicating through the wall of said duct with said chamber through respective openings, said slots being inclined and being oriented so as to be substantially transverse to the rotary movement of said gas stream, said duct at said downstream end being formed with an outwardly divergent collar over which a portion of the gas stream is deflected into said chamber, the openings of said channels through the wall of said duct into said chamber and said slots being so dimensioned that a portion of the gas stream which has passed said slots is drawn over the collar into said chamber.

2. The uniflow cyclone defined in claim 1 wherein each of said channels is defined in part by edges projecting from the respective vane and forming the respective slit therewith, said edges forming said slit and defining skimmer edges which are turned toward said upstream end.

3. The uniflow cyclone defined in claim 1 wherein said channels are inclined in the direction of rotation of the gas stream and inclined relative to the axis at an angle of attack of less than 90°.

4. The uniflow cyclone defined in claim 1 wherein said slots have lengths approximately equal to the widths of said vanes.

5. The uniflow cyclone defined in claim 1 wherein said duct is positioned upright.

6. The uniflow cyclone defined in claim 5 wherein said vanes are of airfoil configuration.

* * * * *